US012660002B2

(12) United States Patent
Lyu et al.

(10) Patent No.: US 12,660,002 B2
(45) Date of Patent: Jun. 16, 2026

(54) METHOD FOR WIRELESS COMMUNICATION, TERMINAL DEVICE, AND NETWORK DEVICE

(71) Applicant: QUECTEL WIRELESS SOLUTIONS CO., LTD., Shanghai (CN)

(72) Inventors: Ling Lyu, Shanghai (CN); Zheng Zhao, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 19/292,008

(22) Filed: Aug. 6, 2025

(65) Prior Publication Data

US 2025/0365774 A1 Nov. 27, 2025

Related U.S. Application Data

(63) Continuation of application No. PCT/CN2024/082524, filed on Mar. 19, 2024.

(51) Int. Cl.
*H04W 74/0833* (2024.01)
*H04L 5/00* (2006.01)
*H04L 5/16* (2006.01)

(52) U.S. Cl.
CPC ....... *H04W 74/0833* (2013.01); *H04L 5/0005* (2013.01); *H04L 5/0055* (2013.01); *H04L 5/16* (2013.01)

(58) Field of Classification Search
CPC ............. H04W 74/0833; H04W 56/00; H04W 72/0446; H04W 56/009; H04W 56/0045; H04W 24/08; H04W 84/06; H04L 5/16; H04B 7/1851

USPC .......................................... 370/328, 329, 330
See application file for complete search history.

(56) References Cited

U.S. PATENT DOCUMENTS

| | | | | |
|---|---|---|---|---|
| 11,982,757 | B2 * | 5/2024 | Wigard | .................... G01S 5/06 |
| 2022/0053487 | A1 | 2/2022 | Sengupta et al. | |
| 2022/0232503 | A1 * | 7/2022 | Cheng | ................. H04W 56/009 |
| 2023/0042274 | A1 * | 2/2023 | He | .................... H04W 74/0841 |
| 2024/0306210 | A1 * | 9/2024 | Guo | .................... H04W 74/002 |
| 2025/0267720 | A1 * | 8/2025 | Lei | .................... H04W 74/0833 |

OTHER PUBLICATIONS

Office Action in Chinese Appln. No. 202480000684.7, dated Dec. 14, 2024, 10 pages (with English translation).

* cited by examiner

*Primary Examiner* — David Q Nguyen
(74) *Attorney, Agent, or Firm* — Fish & Richardson P.C.

(57) ABSTRACT

Disclosed are a method for wireless communication, a terminal device, and a network device. One example method includes: determining, by a first terminal device based on first indication information, a first resource related to half-duplex communication, wherein the first terminal device is a reduced capability (RedCap) device, the first resource is used by the first terminal device to perform at least one of uplink transmission or downlink reception in a non-terrestrial network (NTN), wherein the first resource is a time-frequency resource and is pre-configured, and the first resource comprises a plurality of random access channel occasion (ROs), and at least two ROs in the plurality of ROs respectively correspond to different synchronization signal blocks (SSBs).

20 Claims, 4 Drawing Sheets

100

110

120          120

100

200

METHOD FOR WIRELESS COMMUNICATION, TERMINAL DEVICE, AND NETWORK DEVICE

CROSS-REFERENCE TO RELATED APPLICATIONS

This application is a continuation of International Application No. PCT/CN2024/082524, filed on Mar. 19, 2024, the disclosure of which is hereby incorporated by reference in its entirety.

TECHNICAL FIELD

The present application relates to the field of communications technologies, and more specifically, to a method for wireless communication, a terminal device, and a network device.

BACKGROUND

Some communications systems (for example, non-terrestrial network (non-terrestrial network, NTN) systems) have relatively large transmission delays. In these communications systems, if a terminal device communicates in a half-duplex mode, uplink transmission of the terminal device may conflict with downlink reception of the terminal device, or may conflict with transmission of another terminal device. Therefore, in these communications systems, how to resolve a transmission conflict in the half-duplex mode becomes a technical problem to be urgently resolved.

SUMMARY

The present application provides a method for wireless communication, a terminal device, and a network device. The following describes aspects related to embodiments of the present application.

According to a first aspect, a method for wireless communication is provided, including: determining, by a first terminal device based on first indication information, a first resource related to half-duplex communication, where the first resource is used by the first terminal device to perform uplink transmission and/or downlink reception in an NTN.

According to a second aspect, a method for wireless communication is provided, including: transmitting, by a network device, first indication information to a first terminal device, where the first indication information is used by the first terminal device to determine a first resource related to half-duplex communication, and the first resource is used by the first terminal device to perform uplink transmission and/or downlink reception in an NTN.

According to a third aspect, a terminal device is provided, where the terminal device is a first terminal device, and the terminal device includes: a determining unit, determining, based on first indication information, a first resource related to half-duplex communication, where the first resource is used by the first terminal device to perform uplink transmission and/or downlink reception in an NTN.

According to a fourth aspect, a network device is provided, where the network device includes a transmitting unit, transmitting first indication information to a first terminal device, where the first indication information is used by the first terminal device to determine a first resource related to half-duplex communication, and the first resource is used by the first terminal device to perform uplink transmission and/or downlink reception in an NTN.

According to a fifth aspect, a communications apparatus is provided, including a memory and a processor, where the memory is configured to store a program, and the processor is configured to invoke the program in the memory to execute a method according to the first aspect or the second aspect.

According to a sixth aspect, an apparatus is provided, including a processor, invoking a program from a memory to execute a method according to the first aspect or the second aspect.

According to a seventh aspect, a chip is provided, including a processor, invoking a program from a memory, to cause a device on which the chip is installed to execute a method according to the first aspect or the second aspect.

According to an eighth aspect, a computer-readable storage medium is provided, where the computer-readable storage medium stores a program, and the program causes a computer to execute a method according to the first aspect or the second aspect.

According to a ninth aspect, a computer program product is provided, including a program, where the program causes a computer to execute a method according to the first aspect or the second aspect.

According to a tenth aspect, a computer program is provided, where the computer program causes a computer to execute a method according to the first aspect or the second aspect.

A first terminal device in embodiments of the present application may determine, based on first indication information, a first resource for half-duplex communication. The first resource is used by the first terminal device to perform wireless communication in an NTN. It may be learned that in an NTN system with a relatively long transmission delay, even if a timing advance between a network device and the first terminal device is not aligned, the first terminal device may perform uplink transmission and/or downlink reception on a half-duplex dedicated resource, thereby preventing a conflict with downlink reception of the first terminal device or transmission of another terminal device.

DETAILED DESCRIPTION OF THE EMBODIMENTS

Figure 1:
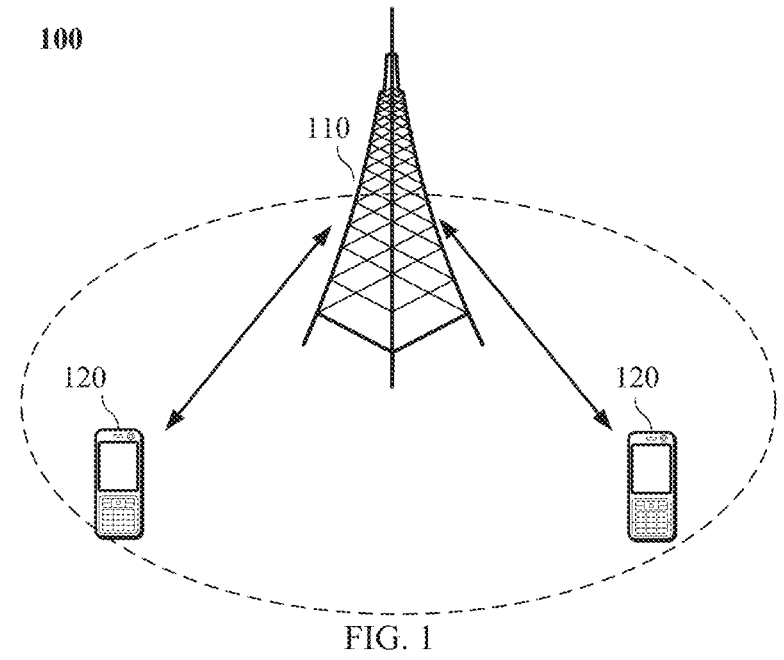
FIG. 1 is a wireless communications system to which embodiments of the present application are applied.

The following describes the technical solutions in embodiments of the present application with reference to the accompanying drawings in embodiments of the present application. Apparently, the described embodiments are some rather than all of embodiments of the present application. For embodiments of the present application, all other embodiments obtained by a person of ordinary skill in the art without creative efforts fall within the protection scope of the present application.

Embodiments of the present application may be applied to various communications systems. For example, embodiments of the present application may be applied to a global system for mobile communications (global system of mobile communication, GSM), a code division multiple access (code division multiple access, CDMA) system, a wideband code division multiple access (wideband code division multiple access, WCDMA) system, general packet radio service (general packet radio service, GPRS), a long-term evolution (long term evolution, LTE) system, an advanced long-term evolution (advanced long term evolution, LTE-A) system, a new radio (new radio, NR) system, an evolved system of an NR system, an LTE-based access to unlicensed spectrum (LTE-based access to unlicensed spectrum, LTE-U) system, an NR-based access to unlicensed spectrum (NR-based access to unlicensed spectrum, NR-U) system, a universal mobile telecommunications system (universal mobile telecommunication system, UMTS), wireless local area networks (wireless local area network, WLAN), wireless fidelity (wireless fidelity, WiFi), and a 5th-generation (5th-generation, 5G) system. Embodiments of the present application may be further applied to another communications system, such as a future communications system. The future communications system may be, for example, a 6th-generation (6th-generation, 6G) mobile communications system, or a satellite (satellite) communications system.

A quantity of connections supported by a conventional communications system is limited, and is also easy to implement. However, with development of communications technologies, a communications system may support not only conventional cellular communications but also one or more other types of communications. For example, the communications system may support one or more of the following communications: device-to-device (device to device, D2D) communications, machine to machine (machine to machine, M2M) communications, machine type communication (machine type communication, MTC), enhanced machine type communication (enhanced MTC, eMTC), vehicle to vehicle (vehicle to vehicle, V2V) communications, vehicle to everything (vehicle to everything, V2X) communications, or the like. Embodiments of the present application may also be applied to a communications system that supports the foregoing communication manners.

The communications system in embodiments of the present application may be applied to a carrier aggregation (carrier aggregation, CA) scenario, a dual connectivity (dual connectivity, DC) scenario, or a standalone (standalone, SA) networking scenario.

The communications system in embodiments of the present application may be applied to an unlicensed spectrum. The unlicensed spectrum may also be considered as a shared spectrum. Alternatively, the communications system in embodiments of the present application may be applied to an unlicensed spectrum. The licensed spectrum may also be considered as a dedicated spectrum.

Embodiments of the present application may be applied to an NTN system. As an example, the NTN system may be a 4G-based NTN system, an NR-based NTN system, an NTN system based on an internet of things (internet of things, IoT), or an NTN system based on a narrow band internet of things (narrow band internet of things, NB-IoT).

The communications system may include one or more terminal devices. The terminal device mentioned in embodiments of the present application may also be referred to as a user equipment (user equipment, UE), an access terminal, a subscriber unit, a subscriber station, a mobile site, a mobile station (mobile station, MS), a mobile terminal (mobile Terminal, MT), a remote station, a remote terminal, a mobile device, a user terminal, a terminal, a wireless communications device, a user agent, a user apparatus, or the like.

In some embodiments, the terminal device may be a station (STATION, ST) in a WLAN. In some embodiments, the terminal device may be a cellular phone, a cordless phone, a session initiation protocol (session initiation protocol, SIP) phone, a wireless local loop (wireless local loop, WLL) station, a personal digital assistant (personal digital assistant, PDA) device, a handheld device with a wireless communication function, a computing device, or another processing device connected to a wireless modem, a vehicle-mounted device, a wearable device, a terminal device in a next-generation communications system (such as an NR system), a terminal device in a future evolved public land mobile network (public land mobile network, PLMN), or the like.

In some embodiments, the terminal device may be a device that provides a user with voice and/or data connectivity. For example, the terminal device may be a handheld device, a vehicle-mounted device, or the like that has a wireless connection function. In some specific examples, the terminal device may be a mobile phone (mobile phone), a Pad (Pad), a notebook computer, a laptop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self-driving (self driving), a wireless terminal in remote medical surgery (remote medical surgery), a wireless terminal in smart grid (smart grid), a wireless terminal in transportation safety (transportation safety), a wireless terminal in smart city (smart city), a wireless terminal in smart home (smart home), or the like.

In some embodiments, the terminal device may be deployed on land. For example, the terminal device may be deployed indoors or outdoors. In some embodiments, the terminal device may be deployed on a surface, such as on a ship. In some embodiments, terminal devices may be deployed in the air, such as on aircrafts, balloons, and satellites.

In addition to the terminal device, the communications system may further include one or more network devices. The network device in embodiments of the present application may be a device for communicating with the terminal device. The network device may also be referred to as an access network device or a radio access network device. The network device may be, for example, a base station. The network device in embodiments of the present application may be a radio access network (radio access network, RAN) node (or device) that connects the terminal device to a wireless network. The base station may broadly cover various names in the following, or may be replaced with the following names, such as a NodeB (NodeB), an evolved NodeB (evolved NodeB, eNB), a next-generation NodeB (next generation NodeB, gNB), a relay station, an access point (access point, AP), a transmitting and receiving point (transmitting and receiving point, TRP), a transmitting point (transmitting point, TP), a master eNodeB MeNB, a secondary eNodeB SeNB, a multi-standard radio (MSR) node, a home base station, a network controller, an access node, a wireless node, a transmission node, a transceiver node, a base band unit (base band unit, BBU), a remote radio unit (remote radio unit, RRU), an active antenna unit (active antenna unit, AAU), a remote radio head (remote radio head, RRH), a central unit (central unit, CU), a distributed unit (distributed unit, DU), a positioning node, or the like. The base station may be a macro base station, a micro base station, a relay node, a donor node, or the like, or a combination thereof. Alternatively, the base station may be a communications module, a modem, or a chip disposed in the device or apparatus described above. Alternatively, the base station may be a mobile switching center, a device that functions as a base station in D2D, V2X, or M2M communications, a network-side device in a 6G network, a device that functions as a base station in a future communications system, or the like. The base station may support networks of a same access technology or different access technologies. A specific technology and a specific device form used by the network device are not limited in embodiments of the present application.

The base station may be fixed or mobile. For example, a helicopter or an unmanned aerial vehicle may be configured to serve as a mobile base station, and one or more cells may move according to a location of the mobile base station. In other examples, a helicopter or an unmanned aerial vehicle may be configured to function as a device in communication with another base station.

In some deployments, the network device in embodiments of the present application may be a CU or a DU, or the network device includes a CU and a DU. The gNB may further include an AAU.

By way of example rather than limitation, in embodiments of the present application, the network device may have a mobility characteristic. For example, the network device may be a mobile device. In some embodiments of the present application, the network device may be a satellite or a balloon station. In some embodiments of the present application, the network device may alternatively be a base station disposed in a location such as land or water.

In embodiments of the present application, the network device may provide a service for a cell. The terminal device communicates with the network device by using a transmission resource (for example, a frequency resource or a spectrum resource) used by the cell. The cell may be a cell corresponding to the network device (for example, a base station). The cell may belong to a macro base station or may belong to a base station corresponding to a small cell (small cell). The small cell herein may include a metro cell (metro cell), a micro cell (micro cell), a pico cell (pico cell), a femto cell (femto cell), or the like. These small cells have characteristics of small coverage and low transmit power, and are suitable for providing a high-rate data transmission service.

Exemplarily, FIG. 1 is a schematic diagram of an architecture of a communications system according to an embodiment of the present application. As shown in FIG. 1, a communications system 100 may include a network device 110, and the network device 110 may be a device that communicates with a terminal device 120 (or referred to as a communications terminal or a terminal). The network device 110 may provide communication coverage in a specific geographic area, and may communicate with a terminal device located in the coverage area.

FIG. 1 exemplarily shows one network device and two terminal devices. In some embodiments of the present application, the communications system 100 may include a plurality of network devices, and another quantity of terminal devices may be included within coverage of each network device. This is not limited herein.

Figure 2:
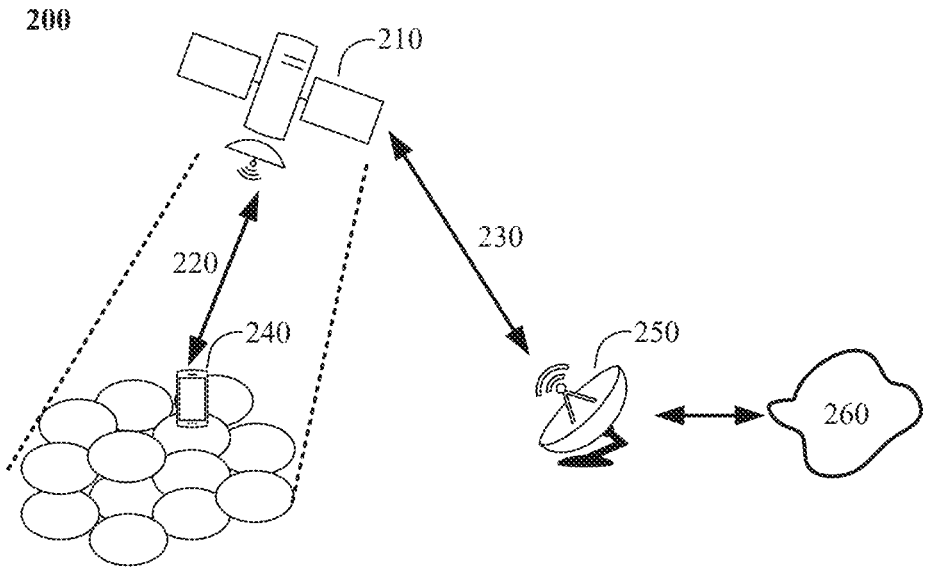
FIG. 2 is an NTN system to which embodiments of the present application are applied.

Exemplarily, FIG. 2 is a schematic diagram of an architecture of the NTN system mentioned above. An NTN system 200 shown in FIG. 2 uses a satellite 210 as an air platform. As shown in FIG. 2, a satellite radio access network includes a satellite 210, a service link 220, a feeder link 230, a terminal device 240, a gateway (gateway, GW) 250, and a network 260 including a base station and a core network.

The satellite 210 is a spacecraft based on a space platform. The service link 220 refers to a link between the satellite 210 and the terminal device 240. The feeder link 230 refers to a link between the gateway 250 and the satellite 210. The Earth-based gateway 250 connects the satellite 210 to a base station or a core network, which specifically depends on a choice of the NTN architecture.

The NTN architecture shown in FIG. 2 is a bent-pipe transponder architecture. In this architecture, the base station is located on the Earth behind the gateway 250, and the satellite 210 serves as a relay. The satellite 210 operates as a repeater for forwarding a signal of the feeder link 230 to the service link 220, or forwards a signal of the service link 220 to the feeder link 230. That is, the satellite 210 does not have a function of a base station, and communication between the terminal device 240 and the base station in the network 260 is necessary to be forwarded by using the satellite 210.

Figures 3, 4, 5:
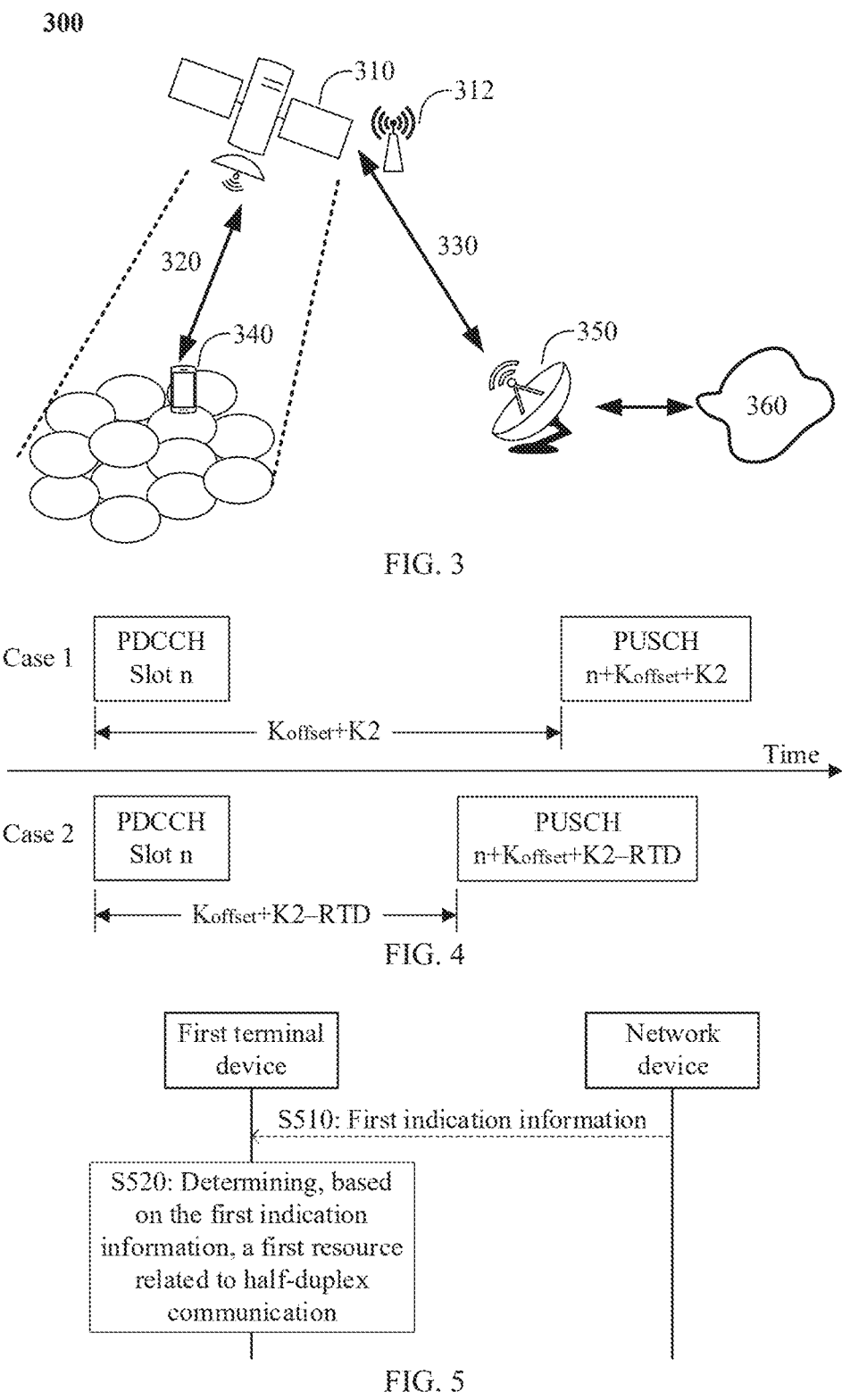
FIG. 3 is another NTN system to which embodiments of the present application are applied.
FIG. 4 is a schematic diagram of two timing manners for scheduling an uplink channel in an NTN system.
FIG. 5 is a schematic flowchart of a method for wireless communication according to an embodiment of the present application.

Exemplarily, FIG. 3 is a schematic diagram of another architecture of an NTN system. As shown in FIG. 3, a satellite radio access network 300 includes a satellite 310, a service link 320, a feeder link 330, a terminal device 340, a gateway 350, and a network 360. Different from that in FIG. 2, a base station 312 is provided on the satellite 310, and the network 360 behind the gateway 350 includes only a core network.

The NTN architecture shown in FIG. 3 is a regenerative transponder architecture. In this architecture, the satellite 310 carries the base station 312, and may be directly connected to the Earth-based core network by using a link. The satellite 310 has a function of a base station, and the terminal device 340 may directly communicate with the satellite 310. Therefore, the satellite 310 may be referred to as a network device.

The communications system with the architecture shown in FIG. 2 or FIG. 3 may include a plurality of network devices, and another quantity of terminal devices may be included within coverage of each network device. This is not limited in embodiments of the present application.

In embodiments of the present application, the communications system shown in FIG. 1 to FIG. 3 may further include another network entity such as a mobility management entity (mobility management entity, MME) or an access and mobility management function (access and mobility management function, AMF). This is not limited in embodiments of the present application.

It should be understood that, in embodiments of the present application, a device that has a communication function in a network or a system may be referred to as a communications device. The communications system 100 shown in FIG. 1 is used as an example. The communications device may include a network device 110 and a terminal device 120 that have a communication function. The network device 110 and the terminal device 120 may be specific devices described above. Details are not described herein again. The communications device may further include another device in the communications system 100, such as a network controller or a mobility management entity, which is not limited in embodiments of the present application.

For ease of understanding, some relevant technical knowledge related to embodiments of the present application is first described. The following related technologies, as optional solutions, may be randomly combined with the technical solutions of embodiments of the present application, all of which fall within the protection scope of embodiments of the present application. Embodiments of the present application include at least a part of the following content.

With development of communications technologies, communications systems (for example, 5G) will integrate market potential of satellites and terrestrial network infrastructure. For example, a 5G standard makes an NTN, including a satellite segment, a part of recognized 3rd generation partnership project (3rd generation partnership project, 3GPP) 5G connection infrastructure.

An NTN is a network or network segment that uses a radio frequency (radio frequency, RF) resource on a satellite platform or an unmanned aerial system (unmanned aerial system, UAS) platform. A satellite is used as an example. According to different orbital altitudes, communications satellites are classified into a low earth orbit (low earth orbit, LEO) satellite, a medium earth orbit (medium earth orbit, MEO) satellite, a geostationary earth orbit (geostationary earth orbit, GEO) satellite, a high elliptical orbit (high elliptical orbit, HEO) satellite, and the like. A LEO is an Earth-centered orbit with a height of 2000 km or less or at least 11.25 periods per day, and eccentricity is less than 0.25. Most artificial objects in outer space are located in a LEO. A LEO satellite operates around the Earth at a high speed (mobility), but in a predictable or definite orbit.

Satellites with different orbital altitudes have different orbital periods. Exemplarily, a typical height of a LEO is 250-1500 km, and an orbital period is 90-120 minutes. A typical height of a MEO is 5000-25000 km, and an orbital period is 3-15 hours. A height of a GEO is about 35786 km, and an orbital period is 24 hours.

It may be learned from FIG. 2 and FIG. 3 in which a satellite is used as an example that, a typical scenario in which a terminal device accesses an NTN system relates to an NTN transparent payload (payload) or an NTN regenerative payload. The bent-pipe transponder architecture shown in FIG. 2 corresponds to an NTN transparent payload, and the regenerative transponder architecture shown in FIG. 3 corresponds to an NTN regenerative payload.

In the NTN system, a terminal device located on the ground performs wireless communication by using an air platform. Different from a terrestrial network (terrestrial network, TN), the NTN generally has a relatively large transmission delay. Exemplarily, because satellites are usually located over hundreds of kilometers above the surface of the Earth, a propagation delay in the NTN is much longer. Specifically, the propagation delay in the NTN varies from several milliseconds to hundreds of milliseconds, depending on a height of a spaceborne or airborne platform and a type of a payload in the NTN.

Due to a relatively large propagation delay, a related problem may be necessary to be resolved when a technology in a terrestrial network is deployed in the NTN system. Exemplarily, in an IoT NTN of release-17 (release-17, Rel-17) or Rel-18, an NB-IoT technology is enhanced to support the NTN.

With development of an IoT technology, in many IoT-like cases in addition to NB-IoT, a reduced capability (reduced capability, RedCap) terminal device may provide a service very well. That is, the RedCap device is also necessary to be applied to the NTN system.

RedCap is a new type of terminal capability information introduced by Rel-17. A RedCap-related terminal device may have reduced complexity and a new power saving function, thereby being more conducive to large-scale commercial popularization and application in a 5G commercial network. NR is used as an example. RedCap may reduce a capability of a device in manners such as reducing a bandwidth, a quantity of transmit or receive antennas, and a rate, adjusting a modulation scheme, and introducing a half-duplex mode, thereby reducing complexity of the terminal device, and achieving a series of objectives such as reducing costs and power consumption of the terminal and prolonging a service life of the terminal. Therefore, requirements of RedCap are different from those of LTE for machines (LTE for machines, LTE-M) and NB-IoT.

It may be learned from the foregoing that RedCap supports a working mode of half duplex (half duplex, HD). In a working mode of half-duplex frequency division multiplexing (frequency division multiplexed, FDD), a communications device may transmit or receive data at different times and frequencies. Compared with full-duplex FDD (full duplex FDD, FD FDD), half-duplex FDD (HD FDD) may not require a duplexer, thereby reducing complexity and costs. When the HD FDD mode is used for RedCap, costs may be saved by about 7%. Exemplarily, a half-duplex FDD device may lower a requirement on a component in a radio frequency front end, and use a transceiver antenna switch and a low-pass filter with relatively low costs instead of a duplexer.

In addition, to enable a network to have flexible control and management over different types of terminal devices, related standards support early identification and access control of RedCap terminal devices. Through the early identification and access control, the network may perform matching scheduling. For example, the network may adjust access of a terminal device according to a network resource and a load, thereby preventing a RedCap terminal device from excessively occupying the network resource, and reducing an impact on performance of a legacy terminal device.

However, introduction of half-duplex FDD poses a challenge to scheduling of a network device. A scheduling manner in an NR system is used as an example. A network device has a plurality of scheduling manners for different signals, including semi-persistent scheduling, dynamic scheduling, and the like.

Exemplarily, a scheduling time offset ($K_{offset}$) is introduced to adapt to a propagation delay in an NTN. $K_{offset}$ may be used to resolve timing relationships between scheduling and transmission of various types of uplink communication, thereby compensating for the propagation delay in the NTN.

Timing from a physical downlink control channel (physical downlink control channel, PDCCH) to a physical uplink shared channel (physical uplink shared channel, PUSCH) is used as an example. The PDCCH may schedule PUSCH communication of a terminal device by determining a K2 value. The timing may also be referred to as "K2" timing, where K2 may be a time offset between transmission of PDCCH communication and receiving of PUSCH communication scheduled by the PDCCH communication.

Exemplarily, a relative location between a PUSCH and a PDCCH corresponding to the PUSCH may be indicated by a K2 field of downlink control information (downlink control information, DCI). For example, K2=0 indicates that the PDCCH and the PUSCH are in a same slot (slot), K2=1 indicates that the PUSCH is in one slot behind the PDCCH, and K2=2 indicates that the PUSCH is in two slots behind the PDCCH.

As an example, in the NTN system, $K_{offset}$ may be used to determine timing from the PDCCH to the PUSCH in the NTN. For example, $K_{offset}$ plus K2 may extend an offset between the PDCCH and the PUSCH, thereby compensating for the propagation delay in the NTN.

As an example, when a round trip delay (round trip delay, RTD) between a terminal device and a network device has a negative offset, a time for the terminal device to transmit a PUSCH may be jointly determined based on $K_{offset}$, K2, and the RTD.

For ease of understanding, the following schematically describes the foregoing two timing manners with reference to FIG. 4. Referring to FIG. 4, a base station in an NTN may transmit a PDCCH to a terminal device in a slot n. For example, the base station may transmit the PDCCH by using a satellite.

As shown in FIG. 4, the terminal device may receive, in the slot n, the PDCCH transmitted by the base station. In a case 1, the terminal device may transmit a PUSCH at a position that is offset by $K_{offset}$+K2 based on the slot n. In a case 2, an RTD between the terminal device and the network device is a negative offset, and the terminal device may transmit a PUSCH at a position of n+$K_{offset}$+K2-RTD.

In the two timing manners shown in FIG. 4, the terminal device may have a requirement of simultaneously performing downlink (downlink, DL) reception and uplink (uplink, UL) transmission. However, in a half-duplex FDD technology, an uplink and a downlink are necessary to perform transmission at different time points. Therefore, a conflict between the uplink and the downlink may occur.

Further, in the NTN system, there is an excessively large propagation delay between the uplink and the downlink. Due to particularity of the NTN system, an HD FDD technology may bring a more complex conflict scenario. A scenario in which a conflict may occur includes but is not limited to a random access procedure and PUSCH transmission.

Exemplarily, the NTN system will also support a frequency range 2 (frequency range 2, FR2). Same as random access of NR, each SSB in a group of synchronization signal blocks (synchronization signal block, SSB) may be associated with different downlink beams. It should be noted that the SSB in embodiments of the present application may also represent a synchronization signal/physical broadcast channel block (synchronization signal/physical broadcast channel block, SS/PBCH block).

In a random access procedure, the terminal device may select a proper downlink beam. Subsequently, the terminal device may transmit a physical random access channel (physical random access channel, PRACH) signal in a corresponding random access channel occasion (random access channel occasion, RACH occasion, RO) associated with a selected SSB, thereby indicating the selection of the terminal device to the network device. The network device may pre-define a mapping between an SSB and an RO.

Therefore, by detecting an RO in which the terminal device executes PRACH transmission, the network device may determine, based on the mapping between an SSB and an RO, which downlink beam is selected by the terminal device.

However, in HD FDD transmission, information between transmission and scheduling may not be transparent. That is, a working mode of HD FDD may cause shielding between uplink or downlink transmission and scheduling. Further, considering a communication delay in the NTN system, the terminal device may have missed the corresponding RO after selecting the SSB. Therefore, the RO set by a network cannot be used the way in a terrestrial network. It may be learned that, even if a relationship between an SSB and an RO is pre-scheduled or pre-set in the NTN network, a conflict may occur between a plurality of terminal devices that support HD FDD, or a conflict with another terminal device that executes an FD FDD mode may occur.

Exemplarily, in the NTN system, a round trip time (round trip time, RTT) with a large delay may exist between uplink transmission and downlink transmission. Generally, the network may evaluate a location and path loss of the terminal device, and notify the terminal device of an adjustment amount of a timing advance (timing advanced, TA) by using a medium access control control element (media access control control element, MAC CE). However, in the HD FDD mode, an uplink and a downlink are not necessary to be synchronized, as long as it is ensured that uplink data and downlink data are normally transmitted. In this scenario, the NTN network may not be able to know in time that the TA of the terminal device in the HD FDD mode has been adjusted, so that transmission of a plurality of downlink slots conflicts with uplink transmission. For example, in an initial access procedure of the NTN, a UL slot may conflict with a plurality of DL slots.

As an example, generally the TA is relatively small in a TN, and slot indexes and symbol indexes of a DL and a UL may be aligned on the base station and the terminal device. Specifically, the terminal device may adjust the TA according to an indication of the base station. Therefore, the base station and the terminal device share a common understanding of overlapping symbols between the DL and the UL and non-overlapping symbols that do not have enough gaps. It may be seen that in the TN, system performance degradation caused by conservative scheduling at the base station due to potential TA misalignment is acceptable. However, the terminal device of the NTN system independently compensates for the TA according to the location of the terminal device and an ephemeris of a serving satellite. Therefore, in a case in which there are not enough gaps, a significant misalignment may exist between the base station and the terminal device when determining an overlapping or non-overlapping symbol between the DL and the UL. Although the terminal device may report TA-related parameters and components to the base station, misalignment between the base station and the terminal device is related to a reporting granularity of a MAC CE that carries a timing advance report. That is, infrequent reporting causes the misalignment. For example, it is defined in 3GPP TS38.321 that the reporting granularity is 1 millisecond. When the terminal device reports a TA based on the reporting granularity of 1 millisecond, a misalignment error between a TA finally known by the base station and an actual TA used by the terminal device may reach 16 milliseconds.

Exemplarily, in an NR NTN, a terminal device is necessary to receive a system information block (system information block, SIB) to perform communication. For example, the terminal device is necessary to read a SIB19 constantly to keep an ephemeris latest. Specifically, the terminal device may determine, based on validity of the ephemeris and a last time of obtaining a SIB19, when to read a SIB19. Because a SIB19 is periodically broadcast, and many SIB19 transmissions exist within a validity period of the ephemeris, a full-duplex terminal device has a large quantity of opportunities to read a SIB19. However, for a half-duplex terminal device, a potential conflict between UL transmission and SIB19 transmissions may deprive the terminal device of an opportunity to read a SIB19. Therefore, the conflict may result in loss of UL throughput of the terminal device and degrade some UL services or rule out half-duplex terminal devices. For example, if UL voice packets are transmitted for 16 times per 20 milliseconds, it is almost impossible to prevent, through scheduling of a base station, a conflict between a PUSCH that carries voice and SIB19 transmission. This conflict may lead to unacceptable voice quality and loss of an opportunity to read a SIB19.

In conclusion, when a technology that supports half-duplex such as RedCap is applied to an NTN system, a possibility of supporting a half-duplex operation through configuring specifically for NTN is necessary to be studied. Therefore, how to deploy a terminal device that supports half-duplex in the NTN system and how to prevent a possible conflict in a half-duplex working mode are technical problems to be urgently resolved.

It should be noted that the foregoing problem that a conflict occurs between uplink transmission and downlink transmission of the NTN system because RedCap supports the half-duplex mode is merely an example. Embodiments of the present application may be applied to a communication scenario of any type of terminal device that supports half-duplex communication in the NTN system.

To resolve the foregoing problem, embodiments of the present application propose a method for wireless communication. By using this method, a first terminal device may determine, based on first indication information, a first resource related to half-duplex communication. It may be learned that the first indication information may be used by the terminal device to determine an uplink transmission resource and/or a downlink reception resource based on a half-duplex mode, thereby preventing a conflict between uplink transmission and downlink transmission of the first terminal device.

For ease of understanding, the following describes in detail the method for wireless communication proposed in embodiments of the present application with reference to FIG. 5. FIG. 5 is described from a perspective of interaction between a first terminal device and a network device. The dashed line in FIG. 5 indicates that the procedure is optional.

Referring to FIG. 5, in step S510, the first terminal device receives first indication information transmitted by the network device.

The first terminal device may be a communications device that performs uplink transmission to the network device, which is not limited herein.

In some embodiments, the first terminal device may be a terminal device in an NTN system or a terminal device that serves as a relay, for example, a UE. In some embodiments, the first terminal device may be a terminal device in an NB-IoT system. In some embodiments, the first terminal device may be a terminal device in a network with a relatively long communication delay or a terminal device that serves as a relay.

In an embodiment, the first terminal device is located in a coverage area of a satellite. For example, the first terminal device is an NTN internet of things terminal.

In an embodiment, the first terminal device is a communications device that performs uplink transmission to a device on a network side in any communications system.

In some embodiments, the first terminal device is a terminal device that supports half-duplex communication or a terminal device that serves as a relay. For example, the first terminal device is the foregoing RedCap device. For another example, the first terminal device is a device that supports half-duplex and has low power consumption.

As an example, the first terminal device may support both a half-duplex mode and another mode. The another mode is, for example, a full-duplex mode.

The network device may be a network device or a device on a network side in any communications system with a relatively large RTD. The communications system with a relatively large RTD is, for example, an NTN system. In some embodiments, the network device includes a satellite in the NTN system, and the first terminal device is a terminal device that communicates by using the satellite. Exemplarily, when a base station is deployed on the satellite, the first terminal device directly communicates with the base station on the satellite. Exemplarily, when the satellite serves as a relay, the first terminal device communicates with the network device located on the ground by using the satellite.

In an embodiment, when the network device includes a satellite, the first terminal device is located in a service area of the satellite at a current instant, to receive first indication information by using the satellite.

In some embodiments, the first terminal device may be one of a plurality of terminal devices. Exemplarily, the first terminal device may be any one of a plurality of terminal devices. A second terminal device other than the first terminal device in the plurality of terminal devices may receive second indication information transmitted by the network device, or may jointly receive the first indication information with the first terminal device, which is not limited herein.

In some embodiments, the plurality of terminal devices may form a terminal device group or a terminal device set. Because the plurality of terminal devices belong to one terminal device set, the network device may transmit indication information to the plurality of terminal devices based on the set.

In an embodiment, when the network device includes a satellite, a plurality of terminal devices in a terminal device group are all located in a service area of the satellite at a current instant, to receive, by using the satellite, indication information corresponding to each terminal device.

The first indication information is used to indicate a resource related to half-duplex communication. The resource related to half-duplex communication may refer to a dedicated resource for half-duplex communication, that is, a communications device may execute wireless communication in the half-duplex mode within the resource. In some embodiments, the wireless communication in the half-duplex mode may be uplink transmission in a random access procedure, such as PRACH transmission in an initial access procedure. In some embodiments, the wireless communication in the half-duplex mode may be transmission of an uplink channel, such as PUSCH transmission. In some embodiments, the wireless communication in the half-duplex mode may alternatively be receiving downlink transmission, for example, the terminal device reads a downlink channel or a SIB transmitted by the network device.

The first indication information may be directly transmitted by the network device to the terminal device, or may be indicated by using higher layer signalling. In some embodiments, the first indication information may be carried in one or more of the following information: a SIB, radio resource control (radio resource control, RRC), or a PDCCH, so that the network device transmits the information to the terminal device. The PDCCH may include DCI. In some embodiments, the first indication information may include an identifier carried in a resource, to indicate, by using higher layer signalling or configuration information, a resource related to half-duplex.

As an example, the first indication information may include a semi-static configuration configured by a higher layer for each channel. The configuration may include but is not limited to a configured grant (configured grant, CG)-PUSCH, semi-persistent scheduling (semi-persistent scheduling, SPS) for a downlink, or a physical uplink control channel (physical uplink control channel, PUCCH). For example, the first indication information may include SIB information or dedicated RRC signalling of the terminal device.

As an example, the first indication information may include a grant message related to resource allocation, to determine a first resource.

In some embodiments, the first indication information may indicate the first resource dedicated to the first terminal device, or may indicate a resource for a plurality of terminal devices, which is not limited herein. The plurality of terminal devices include the first terminal device, and the resource for the plurality of terminal devices includes the first resource.

The first indication information may be used by the first terminal device to determine the first resource related to half-duplex communication. That is, the first indication information may be used by the first terminal device to determine, when executing half-duplex communication, a resource for performing uplink transmission and downlink transmission.

In some embodiments, the first indication information may be determined based on a communication scenario of the first terminal device in the half-duplex mode. The communication scenario of the first terminal device includes but is not limited to scenarios such as the random access procedure and PUSCH transmission that are mentioned above.

In step S520, the first terminal device determines, based on the first indication information, the first resource related to half-duplex communication.

The first resource is used by the first terminal device to perform half-duplex communication in a network. That is, the first resource is a dedicated resource for the half-duplex mode, to prevent a conflict with another mode. In some embodiments, half-duplex communication includes uplink transmission and/or downlink reception based on the half-duplex mode. That is, the first resource may be an uplink transmission resource or a downlink transmission resource.

Exemplarily, the first resource may be a time-frequency resource of any size, which is not limited herein.

Exemplarily, the first resource may be used by the first terminal device to perform uplink transmission and/or downlink reception in the NTN. That is, the first resource is a dedicated resource allocated by the network device to the first terminal device.

Exemplarily, the first resource is used by the first terminal device to perform one or more types of the following wireless communication in the NTN: performing random access in the half-duplex mode; transmitting an uplink channel in the half-duplex mode; or receiving a first SIB in the half-duplex mode.

For example, the first resource may be used by the first terminal device to execute uplink transmission in the half-duplex mode in the NTN. That is, the first resource is a dedicated resource for the first terminal device to execute uplink transmission based on half-duplex, and may also be referred to as a first uplink resource or a half-duplex dedicated uplink resource. In this scenario, the first resource may prevent a conflict between uplink transmission and downlink transmission of the first terminal device.

For another example, the first resource may be used by the first terminal device to execute downlink reception in the half-duplex mode in the NTN. That is, the first resource is a dedicated resource for the first terminal device to execute downlink reception based on half-duplex, and may also be referred to as a first downlink resource or a half-duplex dedicated downlink resource. In this scenario, the first resource may ensure downlink reception of the first terminal device, to prevent reading of necessary downlink data from being missed.

For another example, the first resource may be used by the first terminal device to execute uplink transmission and downlink reception in the half-duplex mode in the NTN. That is, the first resource may be used by the first terminal device to separately determine a half-duplex dedicated transmission resource, to prevent a conflict with another terminal device.

In some embodiments, the first resource may be related to a communication scenario of the first terminal device. The communication scenario has been described above, and details are not described again.

In some embodiments, in a scenario of random access, the first resource may include one or more ROs used by the first terminal device to perform random access in the half-duplex mode. In this scenario, the first indication information may be used to indicate the one or more ROs.

Exemplarily, the first indication information may include a first identifier dedicated to half-duplex communication. The one or more ROs used by the first terminal device may carry the first identifier. Therefore, the first terminal device may determine, based on the first identifier, one or more ROs for performing random access, to prevent a conflict with an RO resource of another terminal device or another mode (for example, a full-duplex FDD mode).

As an example, the first identifier may be an RO_HD identifier. That is, an RO for the half-duplex mode is marked with an RO_HD. Optionally, for a terminal device that performs access based on an HD FDD manner, only an RO with an RO_HD identifier is valid. For example, when an HD FDD mode and an FD FDD mode correspond to a same SSB, a plurality of ROs to which the SSB is mapped may be identified as which ROs belong to HD FDD (being marked with an RO_HD) and which ROs belong to FD FDD, to prevent a conflict with another terminal device.

Exemplarily, a plurality of ROs for performing random access may be grouped, to determine one or more ROs for the half-duplex mode. In this scenario, the first indication information may indicate a first RO group for half-duplex communication. That is, the first RO group in a plurality of RO groups obtained after grouping may be used for half-duplex communication.

As an example, the plurality of ROs that are grouped may correspond to a same SSB or a plurality of SSBs, which is not limited herein. For example, a plurality of RO groups may correspond to a first SSB, that is, the plurality of RO groups correspond to a same SSB.

As an example, the first RO group may include one or more ROs. The first terminal device may select, from the one or more ROs, an RO for performing random access.

As an example, during grouping, a quantity of ROs included in each group may be set by using SIB information or RRC information.

For example, when there are two ROs in frequency domain and three ROs in time domain, one SSB may have six ROs on the whole. The six ROs may be divided into two groups: {RO_FD,RO_HD}. ROs in the two groups respectively correspond to the FD FDD mode and the HD-FDD mode.

Exemplarily, when the first resource includes a plurality of ROs in the one or more ROs, at least two ROs in the plurality of ROs respectively correspond to different SSBs. Respectively corresponding to different SSBs may refer to that the plurality of ROs for the first terminal device to perform random access are scheduled inter-SSBs. When the plurality of ROs are scheduled inter-SSBs, a case in which a delay of the NTN network is relatively large may be met.

As an example, because an SSB usually appears periodically, a plurality of ROs in the first resource may be scheduled in a plurality of SSBs.

As an example, when the HD FDD mode and the FD FDD mode correspond to a same SSB, a terminal device in the half-duplex mode may determine one or more ROs in the first resource based on inter-SSB scheduling.

As an example, when ROs are scheduled inter-SSBs, an RO that is later in time domain may be determined based on an RO that is earlier in time domain. For example, the at least two ROs may include a first RO that is earlier in time domain and a second RO that is later in time domain. In a scenario of inter-SSB scheduling, a time domain position RO' of the second RO may be:

$$RO' = RO + 2^\mu \times K_{cell,offset},$$

where RO represents a time domain position of the first RO, u is related to a subcarrier spacing, and $K_{cell,offset}$ represents a first offset value.

Optionally, a value of $K_{cell,offset}$ may be provided by a parameter CellSpecific_Koffset of an RRC layer.

It should be noted that the manner of scheduling ROs inter-SSBs is not limited to the half-duplex mode. Exemplarily, in the NTN system, when the terminal device performs random access or other communication based on the full-duplex mode, the manner of scheduling ROs inter-SSBs is also applicable.

Exemplarily, considering a mapping relationship between an SSB and an RO, the SSB may also be configured, to prevent different SSBs of an HD FDD terminal device and an FD FDD terminal device in a same serving cell from being mapped to a same RO.

As an example, an SSB for HD FDD is configured on a slot or symbol that is different from that in FD FDD.

As an example, a plurality of SSBs may be grouped, so that the first terminal device determines the first resource. Optionally, some of the plurality of SSBs are used by a terminal device that executes the HD FDD mode in a cell, and the other SSBs are used by a terminal device that executes the FD FDD mode in the cell.

As an example, one or more ROs for the first terminal device to perform random access may correspond to any SSB in a first SSB group that supports half-duplex communication. That is, after the SSBs are grouped, the groups may include the first SSB group that supports half-duplex. The first indication information may be used to indicate the first SSB group.

As an example, a terminal device that supports half-duplex may report a capability indication to the network device. When the network device receives capability information that a terminal device supports half-duplex, the network device may group the SSBs and indicate the first SSB group. It should be understood that the capability information that the terminal device supports half-duplex may support both half-duplex and full-duplex, or may support only half-duplex, which is not limited herein.

For example, the first terminal device may transmit capability information of supporting half-duplex communication to the network device. The capability information may trigger the network device to group a plurality of SSBs, and determine the first indication information. The first terminal device may select, from the first SSB group according to the first indication information, an SSB corresponding to one or more ROs for performing random access.

For example, below 6 GHz, there are four to eight SSBs in one synchronization signal (synchronization signal, SS) burst set, that is, a maximum of eight beams can be swept. If a terminal device reports a capability indication to a network side, indicating that the terminal device supports both HD FDD and FD FDD or supports only HD FDD, the network may group SSBs in an SS burst set, to respectively correspond to different FDD modes. For the terminal device, if the HD FDD working mode is selected, a corresponding SSB is selected from a pre-defined SSB group that supports HD FDD.

In some embodiments, in a communication scenario in which an RRC connection is established, the network device may reserve resources for a plurality of terminal devices that support the half-duplex mode. These reserved resources may form a first resource pool. The first resource pool may also be referred to as an HD FDD CG resource pool. Exemplarily, the network device in the NTN may reserve, by using the first resource pool, a resource for a terminal device that works in the HD FDD mode.

As an example, the first resource pool may include a plurality of continuous time-frequency resources or a plurality of discontinuous time-frequency resources.

As an example, the first resource pool is used to support uplink transmission of a plurality of terminal devices in the half-duplex mode. The plurality of terminal devices include the first terminal device. Therefore, the first resource is a time-frequency resource in the first resource pool.

Optionally, after receiving a first request of the first terminal device, the network device may transmit information about the first resource pool to the first terminal device. The first request is used by the first terminal device to request the network device to allocate a resource within a future time period, to perform uplink communication.

As an example, the first request may include resource information required by the first terminal device, or may include a plurality of types of information for the network device to allocate the first resource to the first terminal device, such as a service type of the first terminal device.

As an example, the first request is, for example, a scheduling request (scheduling request, SR). In the half-duplex mode, a terminal device may transmit an SR to request an uplink resource. The network device may allocate a proper resource to the terminal device in advance, to prevent a conflict between an uplink and a downlink.

As an example, if the NTN network receives SRs from different terminal devices within a specific time T, a base station may allocate uplink transmission resources to all these terminal devices, where Tis a rational number. For example, the first terminal device transmits the first request within a first time period. The first request is used by the first terminal device to request, from the network device, information about the first resource pool and allocation information of the first resource.

Optionally, a length T of the first time period may be related to a relative location between the network device and the terminal device. A location of the terminal device may be determined based on global navigation satellite system (global navigation satellite system, GNSS) information, or may be determined based on positioning information transmitted by the network device. A location of the network device may be determined based on a parameter of a satellite ephemeris.

As an example, when the first terminal device enables the HD FDD working mode, the base station transmits a grant (grant) message to the first terminal device. The grant message may include first indication information. Optionally, the grant message may carry information about an HD FDD CG resource pool and resource allocation information of the first terminal device. Optionally, after the RRC connection is established, the first terminal device may transmit SR information to the NTN network. The NTN network may allocate, to the first terminal device according to the first resource pool, some or all of resources required by a service, and transmit specific resource information to the first terminal device by using PDCCH DCI.

Optionally, the first terminal device may determine the first resource based on the first indication information. For example, the first indication information may be used by the first terminal device to determine a position of the first resource in the first resource pool.

Optionally, the network device may allocate the first resource to the first terminal device according to one or more types of information, to reduce conflicts between HD FDD resources. Exemplarily, the position of the first resource in the first resource pool may be determined based on one or more of the following information: a service level of the plurality of terminal devices; a resource required by the first terminal device; signal strength and/or reference path loss corresponding to the first terminal device; or a quantity of times that the first terminal device receives a negative acknowledgement (negative acknowledge, NACK).

As an example, the service level of the plurality of terminal devices may be determined based on a service level of a service of a terminal device. Optionally, a service level of the first terminal device may be determined based on services of the plurality of terminal devices including the first terminal device. For example, a higher service level of a service of the first terminal device indicates a smaller allocated index (index) in the first resource pool that corresponds to the first resource. That is, a higher level of the first terminal device level indicates that the first resource is closer to a start point position of the first resource pool. When the plurality of terminal devices correspond to different services, allocated resource indexes are different. Therefore, when the plurality of terminal devices perform uplink transmission based on allocated resources, conflicts between HD FDD resources may be reduced.

As an example, the service level of the plurality of terminal devices may include a service priority. Priorities of different services may be set based on different levels of quality of service (quality of service, QoS).

As an example, the first resource may be determined based on the resource required by the first terminal device. Optionally, a size of the first resource is greater than or equal to a size of the resource required by the first terminal device.

As an example, the first resource may be determined based on the signal strength and/or the reference path loss corresponding to the first terminal device. The signal strength may be determined by using a plurality of parameters such as reference signal received power (reference signal received power, RSRP). The reference path loss may be a path loss estimation value of a location of the first terminal device. That is, the reference path loss may be determined based on the location of the terminal device.

As an example, the first resource may be determined based on feedback information received by the first terminal device. Optionally, when the first terminal device performs transmission based on a hybrid automatic repeat request (hybrid automatic repeat reQuest, HARQ), the quantity of times that the first terminal device receives a NACK may be used to determine the first resource.

For example, feedback information of uplink transmission that is received by the first terminal device may include a NACK. When the quantity of times that the first terminal device receives a NACK reaches a first threshold, the first terminal device transmits the first request. The first threshold is, for example, three times or five times.

For example, when a quantity of times that the first terminal device receives NACK of HARQ feedback from a base station reaches the first threshold, the first terminal device may determine that PUSCH transmission may conflict with downlink reception or an uplink transmission of another terminal device. In this scenario, the first terminal device transmits an SR to the NTN. Further, the SR may include information such as a quantity of times that a NACK is received, a service level, and a required resource.

Figures 6, 7, 8, 9:
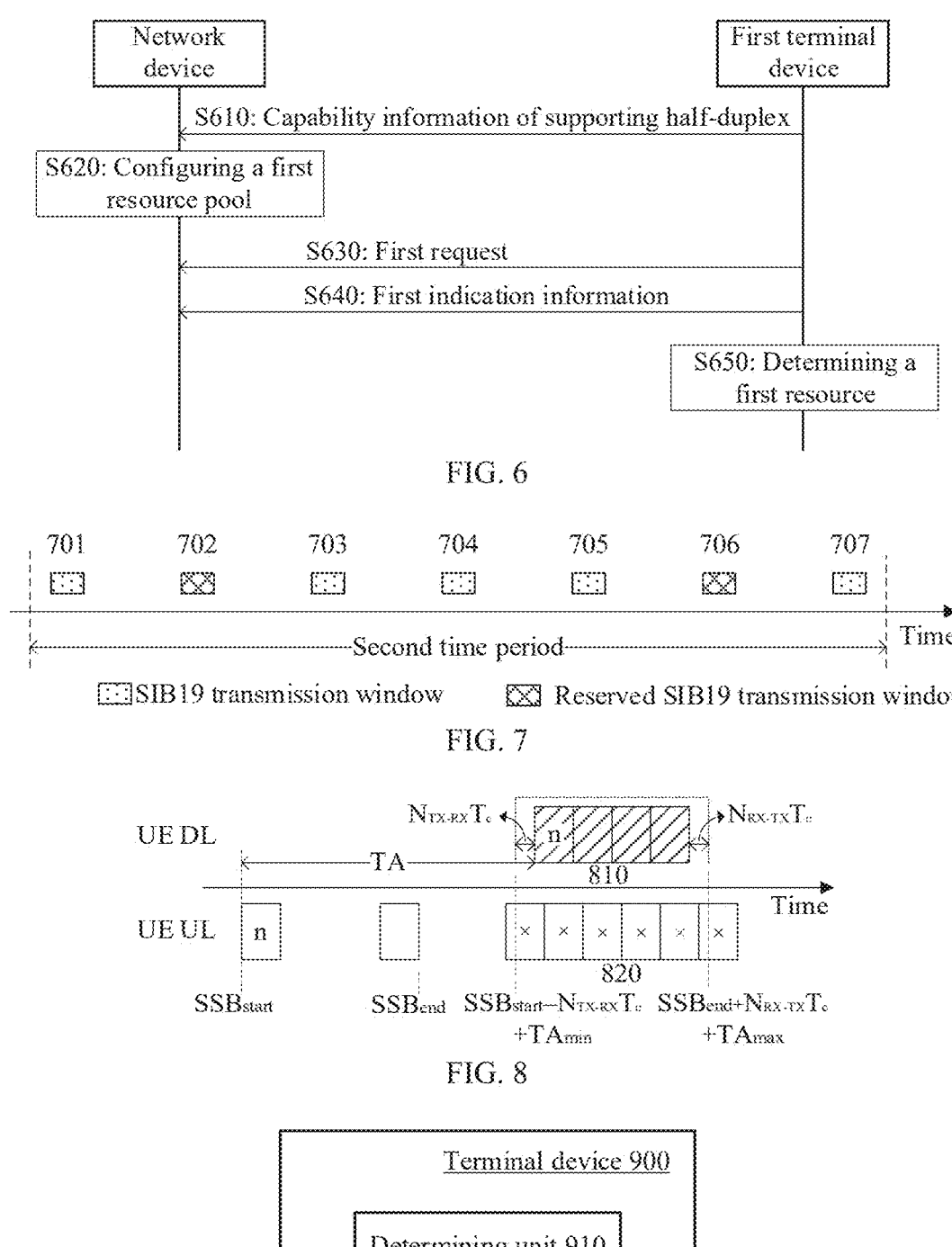
FIG. 6 is a schematic flowchart of a possible implementation of the method shown in FIG. 5.
FIG. 7 is a schematic diagram of a possible implementation of the method shown in FIG. 5.
FIG. 8 is a schematic diagram of another possible implementation of the method shown in FIG. 5.
FIG. 9 is a schematic structural diagram of a terminal device according to an embodiment of the present application.

For ease of understanding, the following exemplarily describes a method for transmitting first indication information by a network device based on a first request with reference to a possible implementation shown in FIG. 6. For brevity, the terms already explained in FIG. 5 are not described again.

Referring to FIG. 6, in step S610, a first terminal device transmits capability information of supporting half-duplex to the network device.

In step S620, the network device configures a dedicated first resource pool for half-duplex according to capability information of one or more terminal devices.

In step S630, the first terminal device transmits the first request to the network device within a first time period.

In step S640, the network device determines a first resource based on the first request and the first resource pool, and transmits the first indication information.

In step S650, the first terminal device determines the first resource based on the first indication information, and performs uplink transmission on the first resource.

Optionally, the first resource may be alternatively determined based on a resource required by the first terminal device and a remaining resource in the first resource pool. When the remaining resource in the first resource pool cannot meet a requirement of the resource required by the first terminal device, the network device is necessary to allocate another resource to the first terminal device. As an example, after receiving an SR transmitted by the first terminal device, an NTN network may determine, based on resource allocation of the first resource pool, whether there is a proper resource. If there is a proper resource in the first resource pool, the network device may allocate or re-allocate a required resource to the first terminal device. If there is no proper resource in the first resource pool, the network device is necessary to dynamically allocate a resource to the first terminal device by using PDCCH DCI.

As an example, when a size of a remaining resource in the first resource pool is less than a size of a resource required by the first terminal device, the first indication information may include indication information for dynamically allocating a resource. That is, when the remaining resource in the first resource pool does not meet a requirement of the first terminal device, the network device may transmit information about the dynamically allocated resource by using the first indication information.

Optionally, a time domain position of the first resource may be further determined based on a time domain position related to the first indication information. The following provides exemplary descriptions with reference to a formula for calculating the first resource.

In some embodiments, in a scenario of downlink reception, the first resource may further include a transmission window for a plurality of types of information transmitted by the network device, so that the first terminal device reads, in a timely manner, various types of information transmitted by the network device.

As an example, the plurality of types of information transmitted by the network device includes a plurality of types of SIBs. A first SIB may be any one or more SIBs in the plurality of SIBs. For example, the first SIB is the foregoing SIB19.

Optionally, the first resource may include one or more transmission windows of the first SIB within a second time period, to ensure that the first terminal device receives the first SIB in a timely manner. Exemplarily, the network device may separately transmit the first SIB within the one or more transmission windows, and the first terminal device may preferentially receive the first SIB within any one of the one or more transmission windows.

As an example, when the first terminal device is also necessary to perform uplink transmission or reception of a downlink channel (a PDCCH and/or a PDSCH) within the any one transmission window, the first terminal device may preferentially receive or read the first SIB.

As an example, when the second time period includes a plurality of transmission windows, the plurality of transmission windows may have a specific interval.

As an example, the second time period may be a window period of system information (system information, SI). A system periodically transmits a SIB19 within an associated SI window period. Duration and a start time of the SI window period are known to the first terminal device. Therefore, the network device may re-configure the SI window for reading a SIB19, so that the first terminal device updates ephemeris information in a timely manner.

As an example, the second time period may be a time period that is periodically configured. For example, the second time period is 1024 subframes.

As an example, the first indication information may indicate configuration information of the one or more transmission windows. Exemplarily, to ensure a time for the first terminal device to read a SIB19, window subsets dedicated to half-duplex devices, that is, SIB19 SI window subsets, are configured within the second time period. For example, the network device may configure dedicated SI windows for all terminal devices that support HD FDD.

As an example, during these subsets of the SI window, the first terminal device may preferentially read the SIB19.

As an example, configuration information of a window subset that supports HD FDD may be indicated by using SIB information or higher layer signalling.

For example, two SI windows are configured for every 1024 subframes. In response, a terminal device that supports HD FDD may attempt to read a SIB19 during any one of the two SI windows. For ease of understanding, the following provides exemplary descriptions with reference to an implementation shown in FIG. 7.

Referring to FIG. 7, there are seven SIB19 transmission windows within a second time period, which are respectively a window 701 to a window 707. The window 702 and the window 706 are reserved (reserved) SIB19 transmission windows that support half-duplex, and the other windows are conventional SIB19 transmission windows. That is, the window 702 and the window 706 represent two SI windows configured for an HD FDD terminal device, and the other windows represent SI windows configured for an FD FDD terminal device. After enabling a half-duplex mode, the first terminal device preferentially receives a SIB19 in the window 702 and the window 706.

With reference to FIG. 5 to FIG. 7, the foregoing describes in detail a method for determining a first resource by a first terminal device based on first indication information. By using this method, a plurality of terminal devices may perform uplink transmission or read a SIB19 on a half-duplex dedicated resource, thereby preventing a conflict between uplink transmission and downlink transmission, and preventing a problem that ephemeris information cannot be updated in a timely manner due to periodic uplink transmission. Further, in a first resource pool, a network device may allocate resources to the plurality of terminal devices according to a plurality of types of information such as a service level, thereby preventing a conflict between transmission of the plurality of terminal devices.

It may be learned from the foregoing that a time domain position of the first resource may be determined based on a time domain position related to the first indication information. The time domain position related to the first indication information may include a time domain position of a plurality of types of information that carry the first indication information.

In some embodiments, the first resource may be determined based on the time domain position related to the first indication information and a second offset value. The second offset value may be determined based on a time length for offsetting and a time length required by transmission performed by the first terminal device. The time length for offsetting is, for example, a time length of a resource for half-duplex communication. The time length required by the transmission performed by the first terminal device includes a time length of a resource required by a service of the first terminal device.

Optionally, the second offset value is determined by an identity (identity, ID) of the first terminal device and/or an ID of a terminal device group to which the first terminal device belongs. For example, the first resource may be associated with the ID related to the first terminal device, to prevent a conflict between different terminal devices.

Exemplarily, when the network device dynamically allocates a resource by using a PDCCH, the time domain position related to the first indication information may be a time domain position of a PDCCH that carries the first indication information.

Exemplarily, the ID of the first terminal device may be an international mobile station equipment identity (international mobile station equipment identity, IMEI) or a temporary IMEI (temporary-IMEI, T-IMEI), which is not limited herein.

As an example, when the second offset value is related to the ID of the first terminal device, the time domain position of the first resource may be:

$$slot_n + K2 + K_{offset} + UE_{ID}\bmod(\lfloor N/L\rfloor),$$

where $slot_n$ represents a time domain position of a PDCCH that carries the first indication information, K2 represents a time offset between the PDCCH and a corresponding uplink channel, $K_{offset}$ represents a time offset for compensating for an NTN transmission delay, $UE_{ID}$ represents the ID of the first terminal device, N represents a time length of a resource for half-duplex communication, and L represents a time length of a resource required by a service of the first terminal device.

Exemplarily, N and L may be determined by a quantity of slots or other time units. For example, N may represent a length of N slots.

Exemplarily, $K_{offset}$ is the foregoing scheduling time offset, and may be set by the network device. In some examples, $K_{offset}$ may be specific to a cell, specific to the first terminal device, or specific to a beam (beam). For example, the network device may configure a corresponding $K_{offset}$ value for each beam from a same satellite and/or a same non-terrestrial cell. The value of $K_{offset}$ may be set to a parameter at a beam level or a cell level.

Exemplarily, the network device or the first terminal device may calculate a cell-specific $K_{offset}$ value of a non-terrestrial cell at least partially based on a distance of a feeder link between a base station or a gateway and a satellite and a maximum possible distance between the base station or the gateway and the terminal device.

Exemplarily, the value of $K_{offset}$ is necessary to be determined based on an actual scenario. For example, for different NTN systems, values of $K_{offset}$ may be different.

Exemplarily, a length of L may be determined based on a size of the first resource pool, or may be determined based on another reserved available resource.

It may be learned from the foregoing formula that the second offset value is $UE_{ID}$ mod ($\lfloor N/L\rfloor$). For each $UE_{ID}$, a relative offset location of a dedicated resource of a terminal device corresponding to the ID is different from that of a terminal device corresponding to another ID. If all of N slots in an uplink resource that are relative to a time domain position of a PDCCH may be selected by a PUSCH, offset locations for different $UE_{ID}$ values are different.

Optionally, when a plurality of terminal devices in one terminal device group may reuse a same resource block (resource block, RB), the second offset value may be further determined based on the ID of the terminal device group to which the first terminal device belongs.

As an example, if a system supports an orthogonal cover code (orthogonal cover code, OCC), transmission data of a plurality of users may be multiplexed onto one RB and distinguished by using an OCC. In this scenario, the plurality of users may determine, through grouping, an ID (Group$_{ID}$) of one terminal device group whose data is multiplexed onto a same RB. If all of N slots in an uplink resource that are relative to a time domain position of a PDCCH may be selected by a PUSCH, offset locations for different Group$_{ID}$ values are different.

As an example, when the second offset value is related to the ID of the terminal device group to which the first terminal device belongs, a time domain position of the first resource is:

$$slot_n + K2 + K_{offset} + Group_{ID}\bmod(\lfloor N/L\rfloor),$$

where Group$_{ID}$ represents the ID of the terminal device group to which the first terminal device belongs, and the second offset value is Group mod ($\lfloor N/L\rfloor$).

Optionally, the second offset value may be further determined based on a priority of the first terminal device or a priority of the terminal device group to which the first terminal device belongs. A priority level is necessary to be set for each terminal device or each terminal device group. A higher priority of the first terminal device or the terminal device group to which the first terminal device belongs indicates that the first resource is closer to a start point of an available resource, that is, an index is smaller.

As an example, when the second offset value is also related to a priority, a time domain position of the first resource may be:

$$slot_n + K2 + K_{offset} + \gamma_i \times Group_{ID}\bmod(\lfloor N/L\rfloor),$$

where $\gamma_i$ represents a priority of a terminal device group to which the first terminal device belongs, and the second offset value is $\gamma_i \times$Group$_{ID}$ mod ($\lfloor N/L\rfloor$).

Optionally, a smaller value of $\gamma_i$ indicates a higher priority of the terminal device group to which the first terminal device belongs.

It may be learned from the foregoing that in an NTN system, misalignment between a base station and a terminal device is related to a reporting granularity of a MAC CE that carries a TA report. That is, the granularity of the TA report cannot meet a relatively large transmission delay in the NTN system. To make a TA of an HD FDD terminal device more accurate, a TA setting in the NTN may be enhanced. The HD FDD terminal device may be the first terminal device.

In some embodiments, the network may set the granularity of the TA report to support duration of a symbol, that is, at a μs (μs) level. By adjusting the time granularity of the TA report, the network device may learn of a TA adjustment amount of the terminal device in a timely manner, thereby reducing TA misalignment.

In some embodiments, the network may set the TA to be within a range of [TA$_{min}$, TA$_{max}$], where TA$_{min}$ and TA$_{max}$ are respectively a minimum TA and a maximum TA of a cell. Because the TA is in the range [TA$_{min}$, TA$_{max}$], the network device may know the minimum TA and the maximum TA of the cell, and potential TA misalignment may be resolved through scheduling of the network device. The network device may determine retention duration of an SSB by using the TA, as shown in FIG. 8. The following exemplarily describes the method with reference to FIG. 8.

Referring to FIG. 8, for a terminal device that has a given TA, a plurality of downlink time units 810, for example, four DL symbols, may be determined based on a TA parameter. In FIG. 8, $N_{TX-RX}$ is duration of an SSB corresponding to switching executed by the terminal device from transmission to receiving, and $N_{RX-TX}$ is duration of an SSB corresponding to switching executed by the terminal device from receiving to transmission. It should be understood that an SSB within a time of switching from transmission to receiving or from receiving to transmission may be considered as an invalid resource for PUSCH transmission. $T_C$ in FIG. 8 represents a minimum sampling time period in a system.

As shown in FIG. 8, for all terminal devices whose TAs are within a TA range ($[TA_{min}, TA_{max}]$), duration from $SSB_{start}-N_{TX-RX}T_C+TA_{min}$ to $SSB_{end}+N_{RX-TX}T_C+TA_{max}$ is retention duration of an SSB. No UL symbol beyond the retention duration conflicts with receiving of the SSB. Six UL symbols that overlap the retention duration are invalid resources. $SSB_{start}$ and $SSB_{end}$ are respectively a start time and an end time of a UL symbol that has a same SSB start symbol index and a same SSB end symbol index.

Exemplarily, when PUSCH repetition and resource allocation are performed on an HD FDD terminal device in an NR NTN, the duration from $SSB_{start}-N_{TX-RX}T_C+TA_{min}$ to $SSB_{end}+N_{RX-TX}T_C+TA_{max}$ may be determined based on the TA range, thereby determining that UL symbols that overlap the duration are invalid resources, and preventing a conflict between uplink transmission and downlink transmission of the terminal device.

The foregoing describes the method embodiments of the present application in detail with reference to FIG. 1 to FIG. 8. The following describes in detail the apparatus embodiments of the present application with reference to FIG. 9 to FIG. 11. It should be understood that the descriptions of the apparatus embodiments correspond to the descriptions of the method embodiments, and therefore, for parts that are not described in detail, refer to the foregoing method embodiments.

FIG. 9 is a schematic block diagram of a terminal device according to an embodiment of the present application. The terminal device 900 may be any one of the foregoing first terminal devices. The terminal device 900 shown in FIG. 9 includes a determining unit 910.

The determining unit 910 may be configured to determine, based on first indication information, a first resource related to half-duplex communication, where the first resource is used by the first terminal device to perform uplink transmission and/or downlink reception in an NTN.

Optionally, the first resource includes one or more ROs, the one or more ROs are used by the first terminal device to perform random access in a half-duplex mode, and the first indication information is used by the first terminal device to determine the one or more ROs.

Optionally, the first indication information includes a first identifier, the one or more ROs carry the first identifier, and the first identifier is used to indicate that the one or more ROs are used for half-duplex communication.

Optionally, the first indication information is used to indicate a first RO group, the first RO group includes one or more ROs, the first RO group is one RO group for half-duplex communication in a plurality of RO groups, and the plurality of RO groups correspond to a first SSB.

Optionally, the first resource includes a plurality of ROs in the one or more ROs, and at least two ROs in the plurality of ROs respectively correspond to different SSBs.

Optionally, the at least two ROs include a first RO that is earlier in time domain and a second RO that is later in time domain, and a time domain position RO' of the second RO is:

where RO represents a time domain position of the first RO, u is related to a subcarrier spacing, and $K_{cell,offset}$ represents a first offset value.

Optionally, the one or more ROs correspond to any SSB in a first SSB group that supports half-duplex communication, the first indication information is used to indicate the first SSB group, and the terminal device 900 further includes a first transmitting unit, transmitting capability information of supporting half-duplex communication to a network device, where the capability information is used to trigger the network device to group a plurality of SSBs, to determine the first indication information. The determining unit 910 is further configured to select, according to the first indication information, an SSB corresponding to the one or more ROs from the first SSB group.

Optionally, the first resource is a time-frequency resource in a first resource pool, the first resource pool is used to support uplink transmission performed by a plurality of terminal devices in the half-duplex mode, and the plurality of terminal devices include the first terminal device.

Optionally, a position of the first resource in the first resource pool is determined based on one or more of the following information: a service level of the plurality of terminal devices; a resource required by the first terminal device; signal strength and/or reference path loss corresponding to the first terminal device; or a quantity of times that the first terminal device receives a NACK.

Optionally, the terminal device 900 further includes a second transmitting unit, transmitting a first request within a first time period, where the first request is used to request, from a network device, information about the first resource pool and allocation information of the first resource.

Optionally, the terminal device 900 further includes a first receiving unit, receiving feedback information of uplink transmission, where the feedback information includes a NACK. The second transmitting unit is further configured to: when a quantity of times that the first terminal device receives a NACK reaches a first threshold, transmit the first request.

Optionally, when a size of a remaining resource in the first resource pool is less than a size of a resource required by the first terminal device, the first indication information includes indication information for dynamically allocating a resource.

Optionally, the first resource includes one or more transmission windows of the first SIB within a second time period, and the terminal device 900 further includes a second receiving unit, preferentially receiving the first SIB within any one of the one or more transmission windows.

Optionally, the first indication information is used to indicate configuration information of the one or more transmission windows, and the first SIB is a SIB19.

Optionally, the first indication information is carried in one or more of the following information: a SIB, RRC, or a PDCCH.

Optionally, the first resource is determined based on a time domain position related to the first indication information and a second offset value, and the second offset value is determined by an ID of the first terminal device and/or an ID of a terminal device set to which the first terminal device belongs.

Optionally, a time domain position of the first resource is:

$$RO' = RO + 2^\mu \times K_{cell,offset},$$

$$slot_n + K2 + K_{offset} + UE_{ID}\mathrm{mod}\,(\lfloor N/L \rfloor),$$

where $slot_n$ represents a time domain position of a PDCCH that carries the first indication information, K2 represents a time offset between the PDCCH and a corresponding uplink channel, $K_{offset}$ represents a time offset for compensating for an NTN transmission delay, $UE_{ID}$ represents the ID of the first terminal device, N represents a time length of a resource for half-duplex communication, and L represents a time length of a resource required by a service of the first terminal device.

Optionally, the first terminal device is any terminal device in a terminal device group that uses a same resource block, and the second offset value is determined based on an ID of the terminal device group.

Optionally, the second offset value is further determined based on a priority of the first terminal device or a priority of a terminal device group to which the first terminal device belongs.

Optionally, a time domain position of the first resource is:

$$slot_n + K2 + K_{offset} + \gamma_i \times Group_{ID} \bmod (\lfloor N / L \rfloor),$$

where $slot_n$ represents a time domain position of a PDCCH that carries the first indication information, K2 represents a time offset between the PDCCH and a corresponding uplink channel, $K_{offset}$ represents a time offset for compensating for an NTN transmission delay, $\gamma_i$ represents the priority of the terminal device group to which the first terminal device belongs, $Group_{ID}$ represents an ID of the terminal device group to which the first terminal device belongs, N represents a time length of a resource for half-duplex communication, and L represents a time length of a resource required by a service of the first terminal device.

Figure 10:
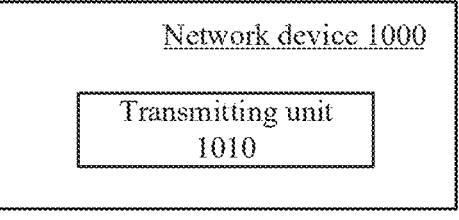
FIG. 10 is a schematic structural diagram of a network device according to an embodiment of the present application.

FIG. 10 is a schematic block diagram of a network device according to an embodiment of the present application. The network device 1000 may be any one of the foregoing network devices. The network device 1000 shown in FIG. 10 includes a transmitting unit 1010.

The transmitting unit 1010 may be configured to transmit first indication information to a first terminal device, where the first indication information is used by the first terminal device to determine a first resource related to half-duplex communication, and the first resource is used by the first terminal device to perform uplink transmission and/or downlink reception in an NTN.

Optionally, the first resource includes one or more ROs, the one or more ROs are used by the first terminal device to perform random access in a half-duplex mode, and the first indication information is used by the first terminal device to determine the one or more ROs.

Optionally, the first indication information includes a first identifier, the one or more ROs carry the first identifier, and the first identifier is used to indicate that the one or more ROs are used for half-duplex communication.

Optionally, the first indication information is used to indicate a first RO group, the first RO group includes one or more ROs, the first RO group is one RO group for half-duplex communication in a plurality of RO groups, and the plurality of RO groups correspond to a first SSB.

Optionally, the first resource includes a plurality of ROs in the one or more ROs, and at least two ROs in the plurality of ROs respectively correspond to different SSBs.

Optionally, the at least two ROs include a first RO that is earlier in time domain and a second RO that is later in time domain, and a time domain position RO' of the second RO is:

$$RO' = RO + 2^\mu \times K_{cell,offset},$$

where RO represents a time domain position of the first RO, u is related to a subcarrier spacing, and $K_{cell,offset}$ represents a first offset value.

Optionally, the one or more ROs correspond to any SSB in a first SSB group that supports half-duplex communication, the first indication information is used to indicate the first SSB group, and the network device 1000 further includes a first receiving unit, receiving capability information of supporting half-duplex communication that is transmitted by the first terminal device, where the capability information is used to trigger the network device to group a plurality of SSBs, to determine the first indication information. The first indication information is used by the first terminal device to select an SSB corresponding to the one or more ROs from the first SSB group.

Optionally, the first resource is a time-frequency resource in a first resource pool, the first resource pool is used to support uplink transmission performed by a plurality of terminal devices in the half-duplex mode, and the plurality of terminal devices include the first terminal device.

Optionally, a position of the first resource in the first resource pool is determined based on one or more of the following information: a service level of the plurality of terminal devices; a resource required by the first terminal device; signal strength and/or reference path loss corresponding to the first terminal device; or a quantity of times that the first terminal device receives a NACK.

Optionally, the network device 1000 further includes a second receiving unit, receiving, within a first time period, a first request transmitted by the first terminal device, where the first request is used to request, from the network device, information about the first resource pool and allocation information of the first resource.

Optionally, the transmitting unit 1010 is further configured to transmit feedback information of uplink transmission to the first terminal device, where the feedback information includes a NACK. The second receiving unit is further configured to: when a quantity of times that the first terminal device receives a NACK reaches a first threshold, receive the first request.

Optionally, when a size of a remaining resource in the first resource pool is less than a size of a resource required by the first terminal device, the first indication information includes indication information for dynamically allocating a resource.

Optionally, the first resource includes one or more transmission windows of the first SIB within a second time period, and the transmitting unit 1010 is further configured to separately transmit the first SIB within the one or more transmission windows.

Optionally, the first indication information is used to indicate configuration information of the one or more transmission windows, and the first SIB is a SIB19.

Optionally, the first indication information is carried in one or more of the following information: a SIB, RRC, or a PDCCH.

Optionally, the first resource is determined based on a time domain position related to the first indication information and a second offset value, and the second offset value is determined by an ID of the first terminal device and/or an ID of a terminal device group to which the first terminal device belongs.

Optionally, a time domain position of the first resource is:

$$slot_n + K2 + K_{offset} + UE_{ID}\,\mathrm{mod}\,(\lfloor N / L \rfloor),$$

where $slot_n$ represents a time domain position of a PDCCH that carries the first indication information, K2 represents a time offset between the PDCCH and a corresponding uplink channel, $K_{offset}$ represents a time offset for compensating for an NTN transmission delay, $UE_{ID}$ represents the ID of the first terminal device, N represents a time length of a resource for half-duplex communication, and L represents a time length of a resource required by a service of the first terminal device.

Optionally, the first terminal device is any terminal device in a terminal device group that uses a same resource block, and the second offset value is determined based on an ID of the terminal device group.

Optionally, the second offset value is further determined based on a priority of the first terminal device or a priority of a terminal device group to which the first terminal device belongs.

Optionally, a time domain position of the first resource is:

$$slot_n + K2 + K_{offset} + \gamma_i \times Group_{ID}\,\mathrm{mod}\,(\lfloor N / L \rfloor),$$

where $slot_n$ represents a time domain position of a PDCCH that carries the first indication information, K2 represents a time offset between the PDCCH and a corresponding uplink channel, $K_{offset}$ represents a time offset for compensating for an NTN transmission delay, $\gamma_i$ represents the priority of the terminal device group to which the first terminal device belongs, $Group_{ID}$ represents an ID of the terminal device group to which the first terminal device belongs, N represents a time length of a resource for half-duplex communication, and L represents a time length of a resource required by a service of the first terminal device.

Figure 11:
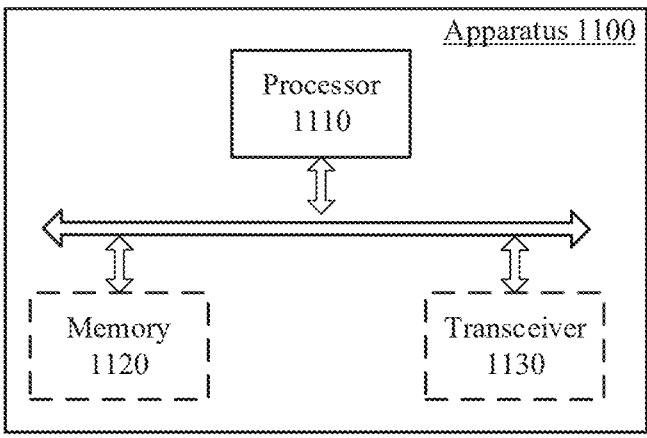
FIG. 11 is a schematic structural diagram of a communications apparatus according to an embodiment of the present application.

FIG. 11 is a schematic structural diagram of a communications apparatus according to an embodiment of the present application. Dashed lines in FIG. 11 indicate that units or modules are optional. The apparatus 1100 may be configured to implement the method described in the foregoing method embodiments. The apparatus 1100 may be a chip, a terminal device, or a network device.

The apparatus 1100 may include one or more processors 1110. The processor 1110 may support the apparatus 1100 to implement the methods described in the foregoing method embodiments. The processor 1110 may be a general-purpose processor or a dedicated processor. For example, the processor may be a central processing unit (central processing unit, CPU). Alternatively, the processor may be another general-purpose processor, a digital signal processor (digital signal processor, DSP), an application-specific integrated circuit (application specific integrated circuit, ASIC), a field-programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

The apparatus 1100 may further include one or more memories 1120. The memory 1120 stores a program, and the program may be executed by the processor 1110, to cause the processor 1110 to execute the methods described in the foregoing method embodiments. The memory 1120 may be separate from the processor 1110 or may be integrated into the processor 1110.

The apparatus 1100 may further include a transceiver 1130. The processor 1110 may communicate with another device or chip by using the transceiver 1130. For example, the processor 1110 may transmit data to and receive data from another device or chip by using the transceiver 1130.

An embodiment of the present application further provides a computer-readable storage medium, storing a program. The computer-readable storage medium may be applied to the terminal device or the network device provided in embodiments of the present application, and the program causes a computer to execute the methods executed by the terminal device or the network device in various embodiments of the present application.

The computer-readable storage medium may be any available medium accessible by a computer or a data storage device such as a server or a data center that integrates one or more available media. The usable medium may be a magnetic medium (for example, a floppy disk, a hard disk, or a magnetic tape), an optical medium (for example, a digital video disc (digital video disc, DVD)), a semiconductor medium (for example, a solid-state drive (solid state disk, SSD)), or the like.

An embodiment of the present application further provides a computer program product. The computer program product includes a program. The computer program product may be applied to the terminal device or the network device provided in embodiments of the present application, and the program causes a computer to execute the methods executed by the terminal device or the network device in various embodiments of the present application.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions in embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (for example, a coaxial cable, an optical fiber, and a digital subscriber line (digital subscriber line, DSL)) manner or a wireless (for example, infrared, radio, and microwave) manner.

An embodiment of the present application further provides a computer program. The computer program may be applied to the terminal device or the network device provided in embodiments of the present application, and the computer program causes a computer to execute the methods executed by the terminal device or the network device in various embodiments of the present application.

The terms "system" and "network" in the present application may be used interchangeably. In addition, the terms used in the present application are merely used to explain the specific embodiments of the present application, and are not intended to limit the present application. The terms "first", "second", "third", "fourth", and the like in the specification, claims, and drawings of the present application are used for distinguishing different objects from each other, rather than defining a specific order. In addition, the terms "include" and "have" and any variations thereof are intended to cover a non-exclusive inclusion.

The "indication" mentioned in embodiments of the present application may be a direct indication or an indirect indication, or indicate an association relationship. For example, if A indicates B, it may mean that A directly indicates B, for example, B can be obtained from A. Alternatively, it may mean that A indirectly indicates B, for example, A indicates C, and B can be obtained from C. Alternatively, it may mean that there is an association relationship between A and B.

In embodiments of the present application, the term "corresponding" may mean that there is a direct or indirect correspondence between two elements, or that there is an association between two elements, or that there is a relationship of "indicating" and "being indicated", "configuring" and "being configured", or the like.

In embodiments of the present application, "pre-defining" or "pre-configuring" can be implemented by pre-storing corresponding code or a corresponding table in a device (for example, including a terminal device and a network device) or in other manners that may be used for indicating related information. A specific implementation thereof is not limited in the present application. For example, pre-defining may indicate being defined in a protocol.

In embodiments of the present application, the "protocol" may indicate a standard protocol in the communication field, which may include, for example, an LTE protocol, an NR protocol, and a related protocol applied to a future communications system. This is not limited in the present application.

In embodiments of the present application, determining B based on A does not mean determining B based on only A, but instead B may be determined based on A and/or other information.

In embodiments of the present application, the term "and/or" is merely an association relationship that describes associated objects, and represents that there may be three relationships. For example, A and/or B may represent three cases: only A exists, both A and B exist, and only B exists. In addition, the character "/" in this specification generally indicates an "or" relationship between the associated objects.

In embodiments of the present application, sequence numbers of the foregoing processes do not mean execution orders. The execution orders of the processes should be determined based on functions and internal logic of the processes, and should not be construed as any limitation on the implementation processes of embodiments of the present application.

In several embodiments provided in the present application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not executed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be at one location, or may be distributed on a plurality of network elements. Some or all of the units may be selected according to actual requirements to achieve the objective of the solutions of embodiments.

In addition, function units in embodiments of the present application may be integrated into one processing unit, or each of the units may exist alone physically, or two or more units may be integrated into one unit.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for wireless communication, comprising:
   determining, by a first terminal device based on first indication information, a first resource related to half-duplex communication,
   wherein the first terminal device is a reduced capability (RedCap) device, the first resource is used by the first terminal device to perform at least one of uplink transmission or downlink reception in a non-terrestrial network (NTN), wherein the first resource is a time-frequency resource and is pre-configured, and the first resource comprises a plurality of random access channel occasion (ROs), and at least two ROs in the plurality of ROs respectively correspond to different synchronization signal blocks (SSBs), and wherein the first resource is a time-frequency resource in a first resource pool, the first resource pool comprises resources for uplink transmission of a plurality of terminal devices in a half-duplex mode, and the plurality of terminal devices comprise the first terminal device, wherein when a size of a remaining resource in the first resource pool is less than a size of a resource required by the first terminal device, the first indication information comprises indication information for dynamically allocating a resource; and
   performing at least one of uplink transmission in the NTN or downlink reception in the NTN by using the first resource.

2. The method according to claim 1, wherein the plurality of ROs are used by the first terminal device to perform random access in a half-duplex mode, and the first indication information is used by the first terminal device to determine the plurality of ROs.

3. The method according to claim 2, wherein the first indication information comprises a first identifier, the plurality of ROs carry the first identifier, and the first identifier indicates that the plurality of ROs are used for half-duplex communication.

4. The method according to claim 2, wherein the first indication information indicates a first RO group, the first RO group comprises the plurality of ROS, the first RO group is one RO group for half-duplex communication in a plurality of RO groups, and the plurality of RO groups correspond to a SSB.

5. The method according to claim 2, wherein the at least two ROs comprise a first RO that is earlier in time domain and a second RO that is later in time domain, and a time domain position RO' of the second RO is:

$$RO' = RO + 2^{\mu} \times K_{cell,offset},$$

wherein RO represents a time domain position of the first RO, u is related to a subcarrier spacing, and $K_{cell,offset}$ represents a first offset value.

6. The method according to claim 5, wherein the plurality of ROs correspond to a first SSB group that supports half-duplex communication, the first indication information indicates the first SSB group, and the method further comprises:

transmitting, by the first terminal device, capability information of supporting half-duplex communication to a network device; and selecting, by the first terminal device according to the first indication information, an SSB corresponding to the plurality of ROs from the first SSB group.

7. The method according to claim 1, wherein a position of the first resource in the first resource pool is determined based on one or more of following information:

a service level of the plurality of terminal devices;

a resource required by the first terminal device;

signal strength or reference path loss corresponding to the first terminal device; or a quantity of times that the first terminal device receives a negative acknowledgement (NACK).

8. The method according to claim 1, wherein the method further comprises:

transmitting, by the first terminal device, a first request within a first time period, wherein the first request is used to request, from a network device, information about the first resource pool and allocation information of the first resource.

9. The method according to claim 8, wherein the method further comprises:

receiving, by the first terminal device, feedback information of uplink transmission, wherein the feedback information comprises a NACK; and when a quantity of times that the first terminal device receives a NACK reaches a first threshold, transmitting, by the first terminal device, the first request.

10. The method according to claim 5, wherein the first resource comprises one or more transmission windows of a first system information block (SIB) within a second time period, and the method further comprises:

receiving, by the first terminal device, the first SIB within any one of the one or more transmission windows.

11. The method according to claim 10, wherein the first indication information indicates configuration information of the one or more transmission windows, and the first SIB is a SIB19.

12. The method according to claim 5, wherein the first indication information is carried in one or more of following information: a system information block (SIB), a radio resource control (RRC) signal, or a physical downlink control channel (PDCCH).

13. The method according to claim 5, wherein the first resource is determined based on a time domain position related to the first indication information and a second offset value, and the second offset value is determined based on an identity (ID) of the first terminal device or an ID of a terminal device group to which the first terminal device belongs.

14. The method according to claim 13, wherein a time domain position of the first resource is:

$$slot_n + K2 + K_{offset} + UE_{ID} \bmod (\lfloor N/L \rfloor),$$

wherein $slot_n$ represents a time domain position of a PDCCH that carries the first indication information, K2 represents a time offset between the PDCCH and a corresponding uplink channel, $K_{offset}$ represents a time offset for compensating for an NTN transmission delay, $UE_{ID}$ represents the ID of the first terminal device, "N" represents a time length of a resource for half-duplex communication, and L represents a time length of a resource required by a service of the first terminal device.

15. The method according to claim 13, wherein the first terminal device is a terminal device in a terminal device group that uses a same resource block, and the second offset value is determined based on an ID of the terminal device group.

16. The method according to claim 13, wherein the second offset value is further determined based on a priority of the first terminal device or a priority of a terminal device group to which the first terminal device belongs.

17. A method for wireless communication, comprising:

transmitting, by a network device, first indication information to a first terminal device, wherein the first terminal device is a reduced capability (RedCap) device, the first indication information indicates a first resource related to half-duplex communication, wherein the first resource is used to perform at least one of uplink transmission or downlink reception with the first terminal device in a non-terrestrial network (NTN), wherein the first resource is a time-frequency resource and is pre-configured, and the first resource comprises a plurality of random access channel occasion (ROs), and at least two ROs in the plurality of ROs respectively correspond to different synchronization signal blocks (SSBs)), and wherein the first resource is a time-frequency resource in a first resource pool, the first resource pool comprises resources for uplink transmission of a plurality of terminal devices in a half-duplex mode, and the plurality of terminal devices comprise the first terminal device, wherein when a size of a remaining resource in the first resource pool is less than a size of a resource required by the first terminal device, the first indication information comprises indication information for dynamically allocating a resource.

18. A first terminal device, comprising:

at least one processor; and one or more non-transitory computer-readable storage media coupled to the at least one processor and storing programming instructions for execution by the at least one processor, wherein the programming instructions, when executed, cause the first terminal device to perform operations comprising:

determining, based on first indication information, a first resource related to half-duplex communication, wherein the first terminal device is a reduced capability (RedCap) device, the first resource is used by the first terminal device to perform at least one of uplink transmission or downlink reception in a non-terrestrial network (NTN), wherein the first resource is a time-frequency resource and is pre-configured, and the first resource comprises a plurality of random access channel occasion (ROs), and at least two ROs in the plurality of ROs respectively correspond to different synchronization signal blocks (SSBs), and wherein the first resource is a time-frequency resource in a first resource pool, the first resource pool comprises resources for uplink transmission of a plurality of terminal devices in a half-duplex mode, and the plurality of terminal devices comprise the first terminal device, wherein when a size of a remaining resource in the first resource pool is less than a size of a resource required by the first terminal device, the first indication information comprises indication information for dynamically allocating a resource; and performing at least one of uplink transmission in the NTN or downlink reception in the NTN by using the first resource.

19. The first terminal device according to claim 18, wherein a position of the first resource in the first resource pool is determined based on one or more of following information:

a service level of the plurality of terminal devices;

a resource required by the first terminal device;

signal strength or reference path loss corresponding to the first terminal device; or a quantity of times that the first terminal device receives a negative acknowledgement (NACK).

20. The first terminal device according to claim 18, wherein the operations comprise:

transmitting a first request within a first time period, wherein the first request is used to request, from a network device, information about the first resource pool and allocation information of the first resource.

\* \* \* \* \*